No. 839,709. PATENTED DEC. 25, 1906.
J. BIJUR.
ELECTRIC REGULATOR.
APPLICATION FILED FEB. 9, 1905.
6 SHEETS—SHEET 1.
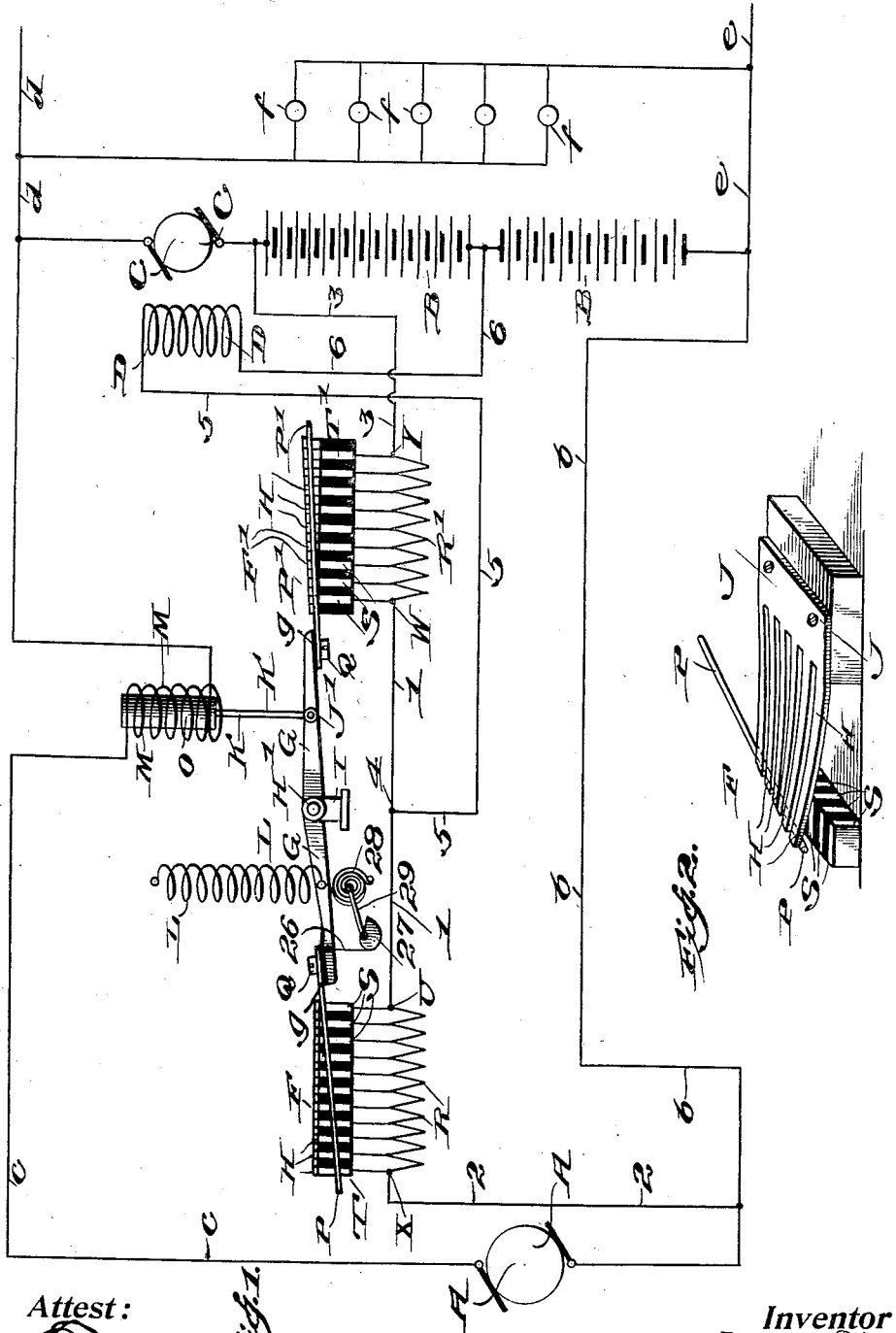
Attest:
E. O. Mitchell
R. W. Tichley
Inventor:
JOSEPH BIJUR
by Dickerson, Brown, Raegener & Binney
Attys.

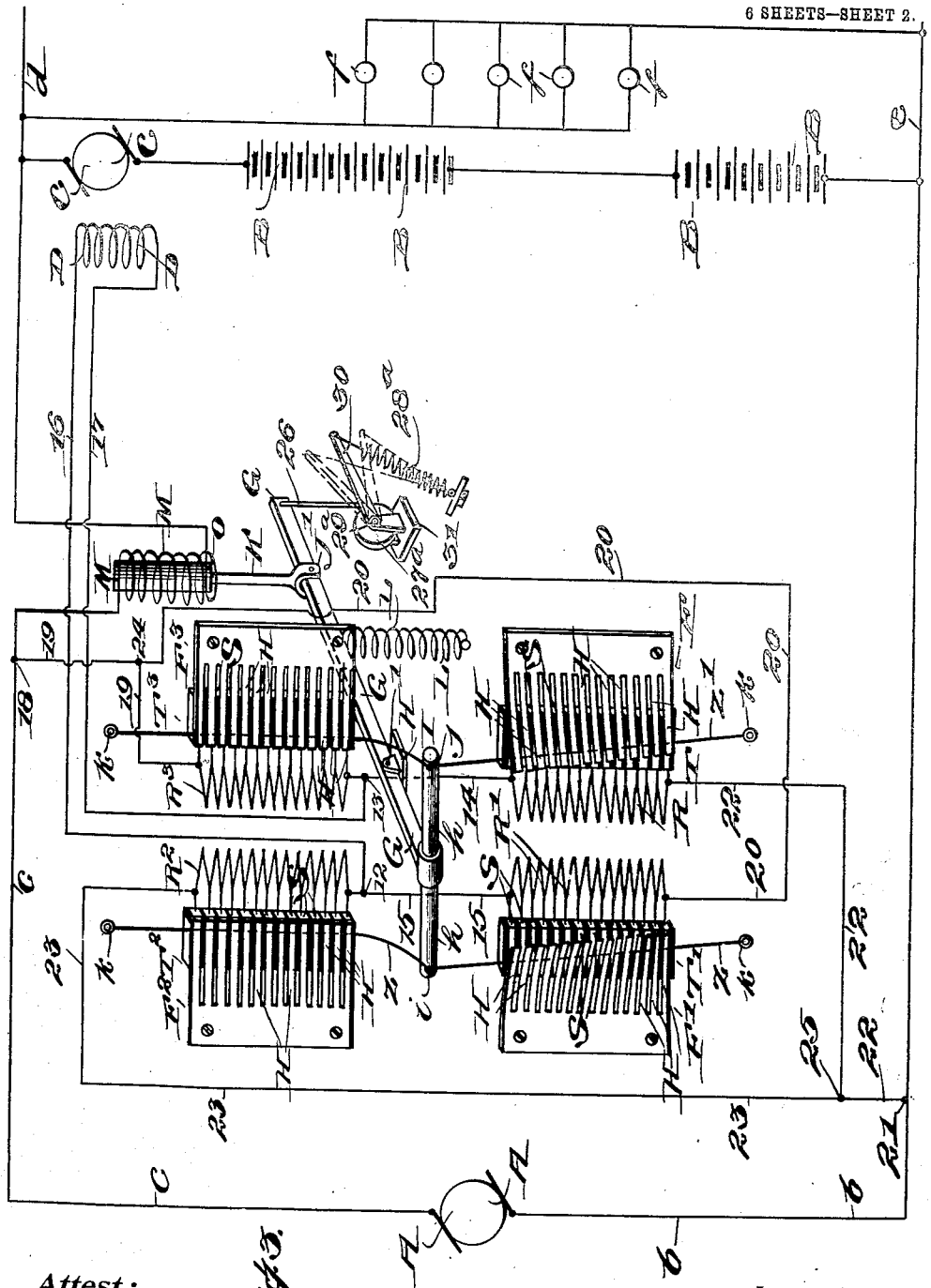

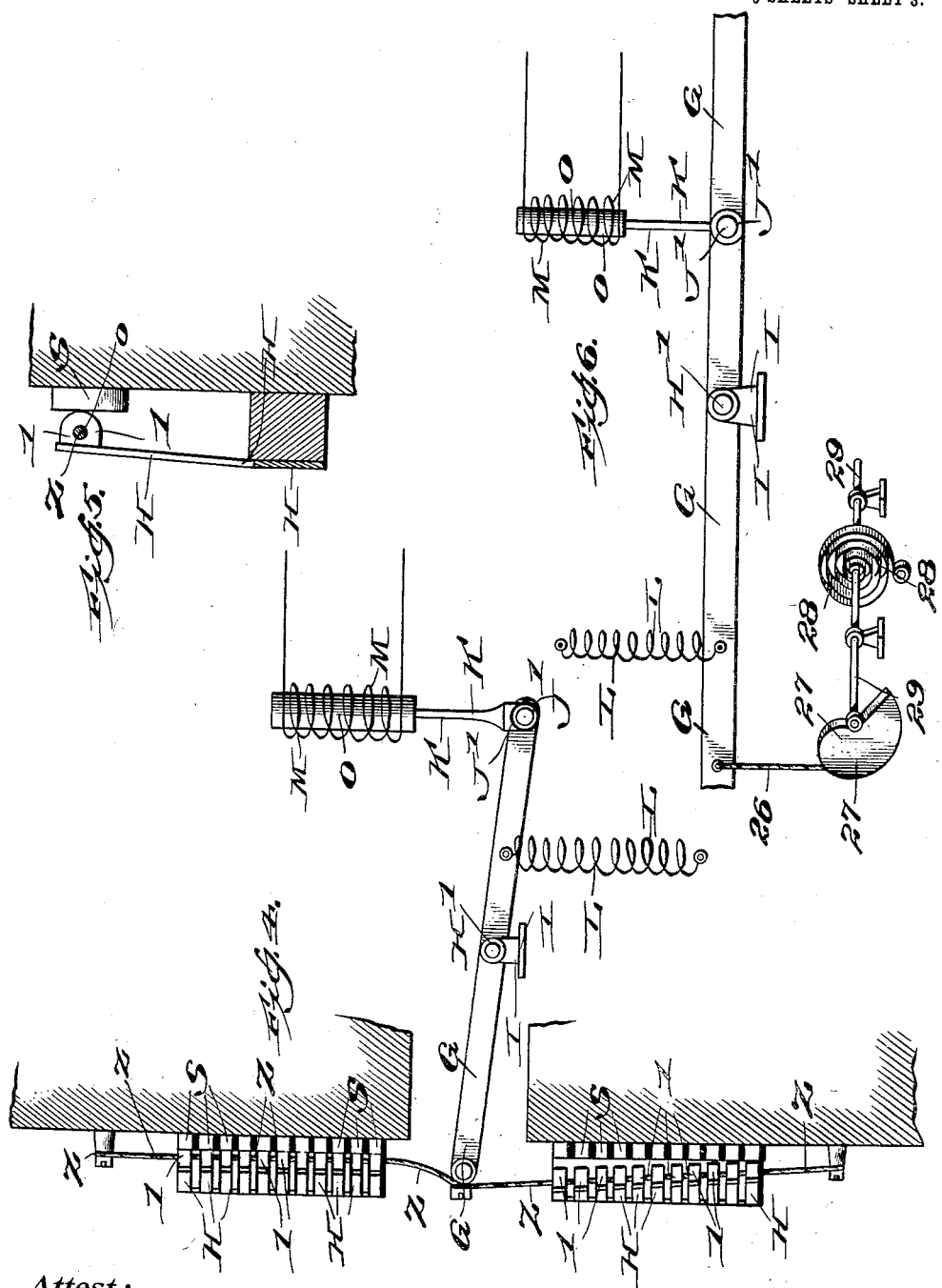

No. 839,709. PATENTED DEC. 25, 1906.
J. BIJUR.
ELECTRIC REGULATOR.
APPLICATION FILED FEB. 9, 1906.
6 SHEETS—SHEET 4.
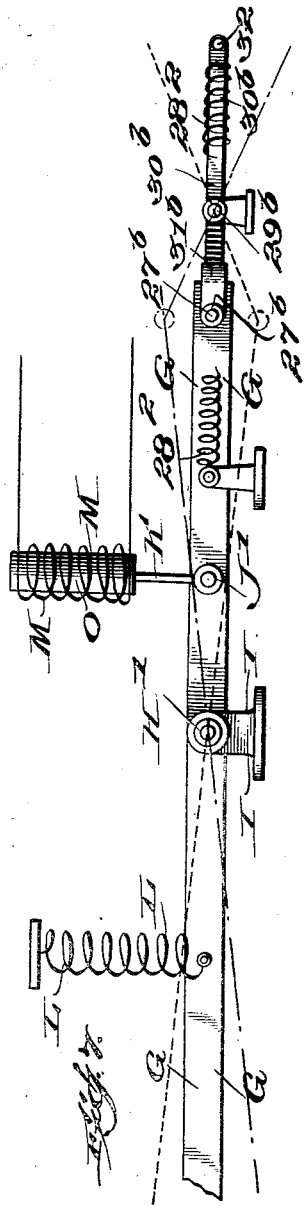
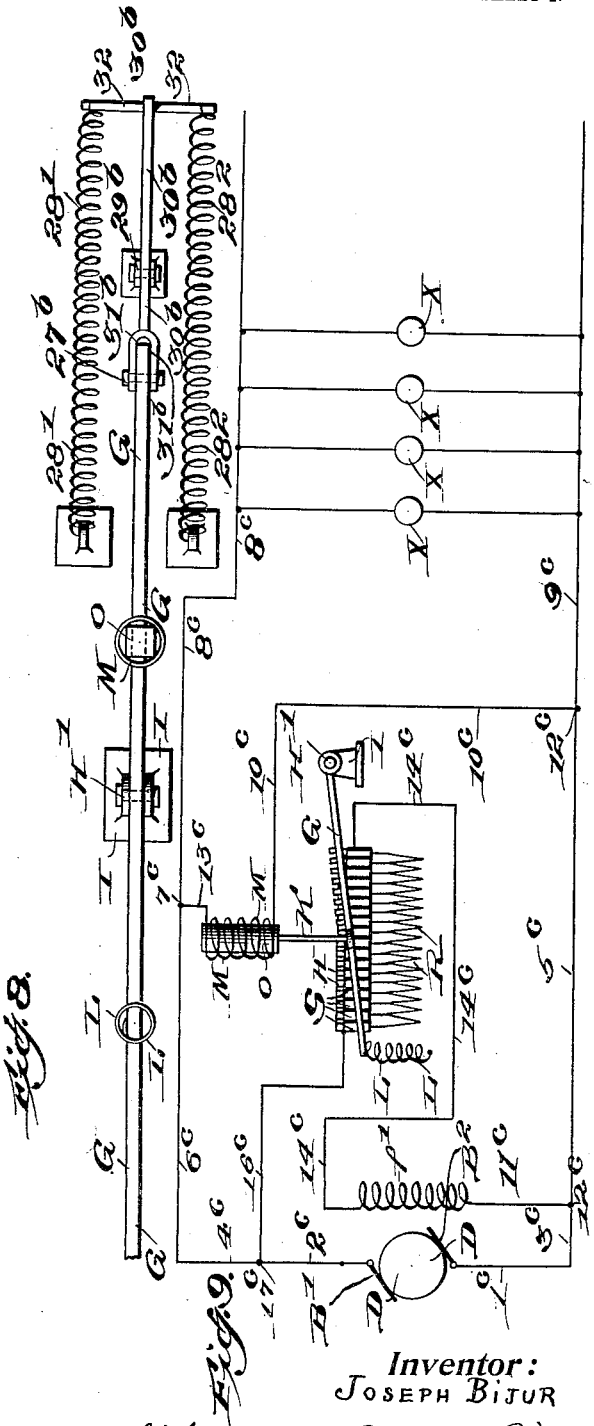
Attest:
Inventor:
JOSEPH BIJUR
by Dickerson, Brown, Raegener & Binney
Attys No. 839,709. PATENTED DEC. 25, 1906.
J. BIJUR.
ELECTRIC REGULATOR.
APPLICATION FILED FEB. 9, 1905.
6 SHEETS—SHEET 5.
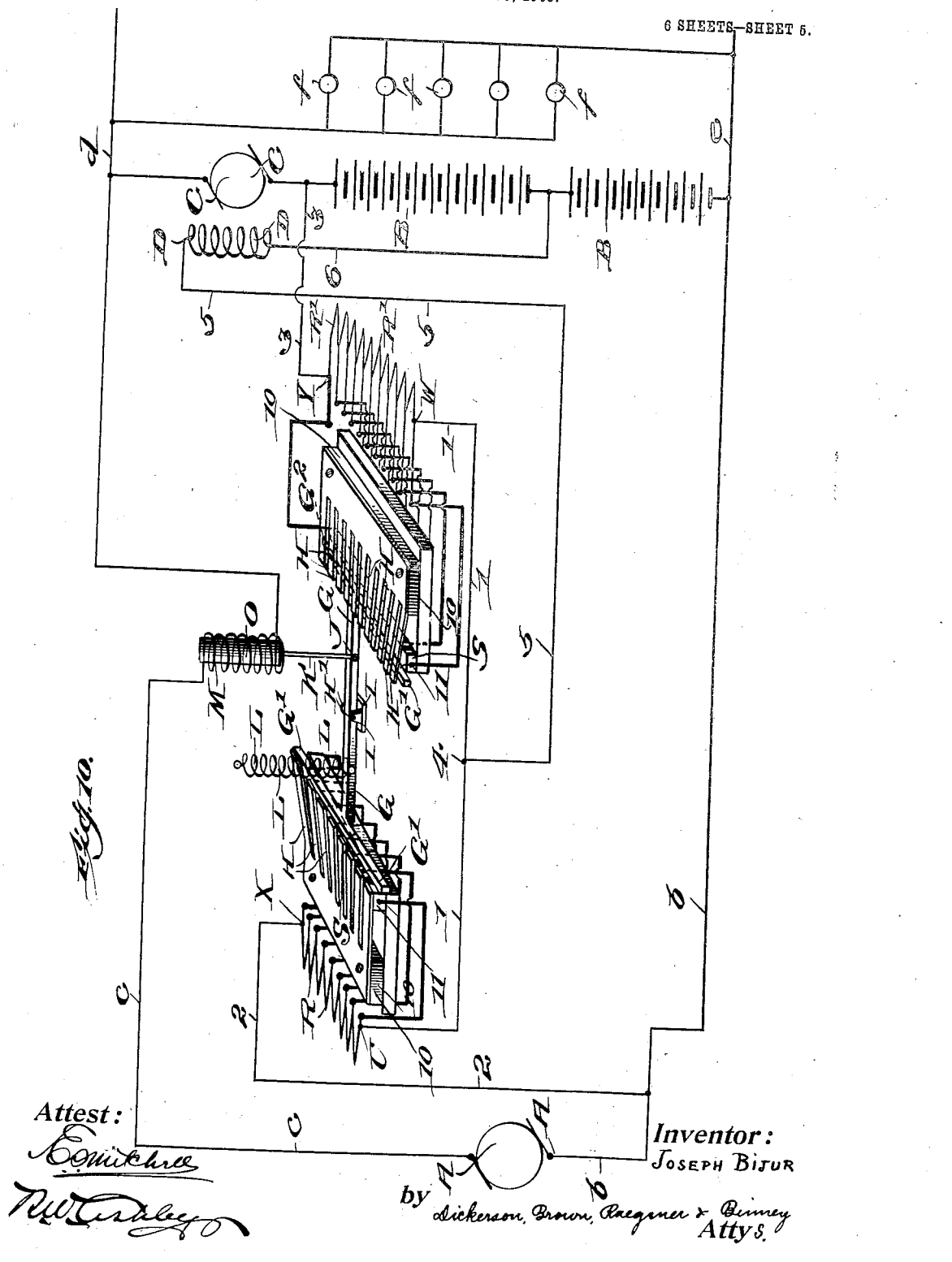
Attest:
Inventor:
Joseph Bijur
by Dickerson, Brown, Raegener & Binney
Attys.

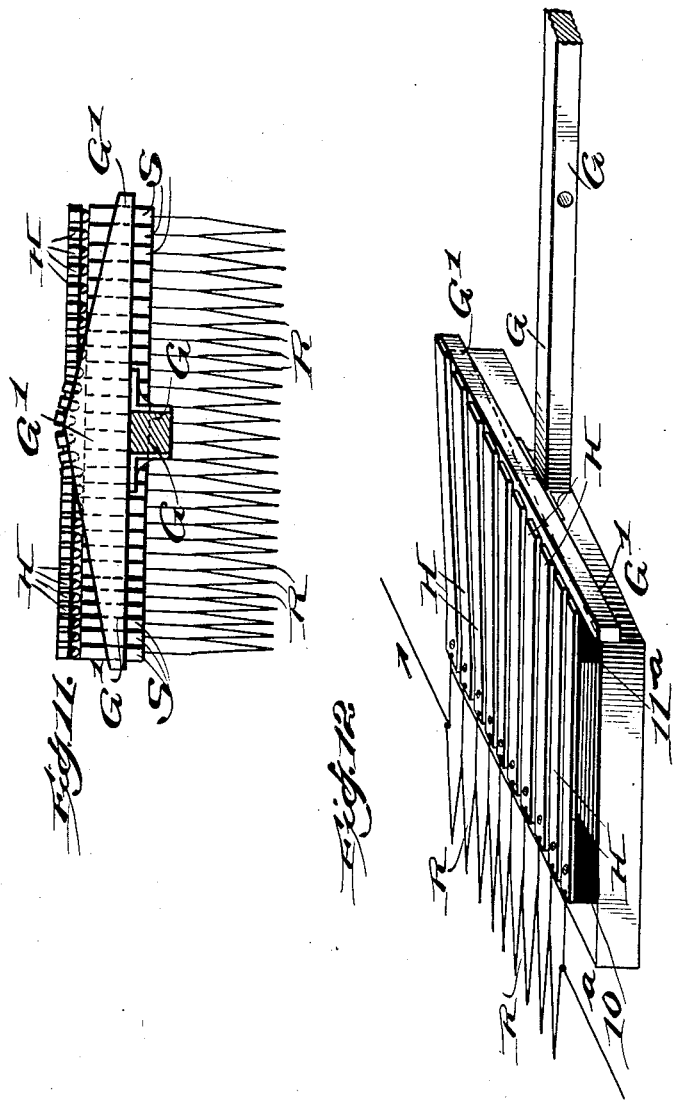

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

ELECTRIC REGULATOR.

No. 839,709.  Specification of Letters Patent.  Patented Dec. 25, 1906.

Application filed February 9, 1905. Serial No. 244,897.

*To all whom it may concern:*

Be it known that I, JOSEPH BIJUR, a citizen of the United States, and a resident of the borough of Manhattan, city, county, and State of New York, have invented certain new and useful Improvements in Electric Regulators, of which the following is a specification accompanied by drawings.

This invention relates to electric regulators and systems of regulation; and the objects of the invention are to improve upon the construction and operation of such regulators and obtain a large range of movement in the contact-controlling devices by means of a relatively small movement of an electroresponsive device, whereby regulation of the circuits may be more quickly and effectively produced than heretofore and the efficiency, sensitiveness, and certainty of operation of a system of electric regulation correspondingly increased.

To these ends the invention consists of a regulator and system of regulation for carrying out the above objects embodying the features of construction, combinations of elements, and arrangement of circuits, connections, and parts having the general mode of operation substantially as hereinafter fully described and claimed in this specification and shown in the accompanying drawings, in which—

Figure 1 is a diagrammatic representation, partly in elevation, of a regulator constructed in accordance with this invention, together with suitable electric circuits for the same. Fig. 2 is a detail perspective view of a portion of the regulator. Fig. 3 is a diagrammatic representation, partly in perspective, with suitable circuits, illustrating another form of the invention. Fig. 4 is a detail view of the regulator. Fig. 5 is a detail view of one of the spring-fingers of the regulator. Fig. 6 is an enlarged detail side elevation of one means for compensating for variations in the pressure on the spring-fingers in order to preserve the balance of forces in any position of the controller-arms. Figs. 7 and 8 are detail side elevation and plan views of another compensating means. Fig. 9 is a diagrammatic view of the application of the invention to the regulation of the voltage of a generator. Fig. 10 is a diagrammatic view, partly in perspective, of a modified form of the regulator. Figs. 11 and 12 are detail views of modified forms of the regulator.

The invention is shown in connection with a system of electric distribution in which storage batteries are used in addition to the generating-dynamo and an auxiliary dynamo is provided to cause the battery to charge or discharge as the external load decreases or increases. The voltage of the auxiliary dynamo is made to vary in direction and amount, or both, as the voltage requirements of the system may necessitate. The object of such a system is to maintain a substantially constant load on the generating-dynamo with a fluctuating external load, and my improved regulator is especially efficient in attaining the desired object, although, of course, the regulator may be used with any system or in any connection in which it may be found applicable.

Referring to all of the sheets of drawings, A represents a suitable dynamo or source of supply connected to the mains $b$ and $c$, while the work portion of the system carrying the external load is represented by the conductors $d$ and $e$. In this instance the load is represented by the lamps $f$, by way of illustration. Connected across the mains is shown a storage battery B, in series with which is arranged the armature of the auxiliary dynamo C, the field D of which is connected to be varied both in direction and amount by the electromagnetic controller which controls the resistances R and R', connected in circuit with the field-winding D of dynamo C. The electric controller is so connected as to be responsive to changes in the external load of lamps $f$ or other electroreceptive devices.

In Fig. 1 two resistances R and R' are shown by way of illustration, in this instance connected, as shown, to the individual segments S of the series of insulated segments T and T'. In all of the figures the regulator is constructed to short-circuit one or the other of the resistances R R' in such manner that when all of one resistance is short-circuited the other resistance is all in circuit, there being intermediate positions of the regulator in which portions of each resistance are short-circuited.

In all of the drawings the electric regulator is controlled by a suitable electroresponsive device, shown in this instance as an electromagnet M included in the main line. The regulator made in accordance with this invention is constructed to mulitply motion, so that a very slight movement of the magnet-core O will produce a very much greater movement of the portions of the regulator which control the resistances R and R'. The sensitiveness of the apparatus is thus very greatly increased and a substantially constant load on the generating-dynamo with a fluctuating external load is more readily obtained than heretofore, because a prompt response is given by the regulator when the load first begins to change.

One means of obtaining the desired multiplication of motion consists of the apparatus shown in Figs. 1 and 2, in which there are series of flexible spring-fingers F and F', provided with the individual spring-fingers H, adapted to bear upon the series of segments T T'. As shown in this instance, the series of spring-fingers F and F' are constructed in the form of combs provided with backs J. When all of the spring-fingers H of a series F or F' bear upon all of the segments S of the coöperating series, it will be seen that all of the resistance connected to said segments will be short-circuited and more or less of a resistance will be short-circuited, according to the number of spring-fingers H bearing upon the segments S of the series T and T'. Suitable means are provided for causing the spring-fingers H of both series to bear upon the segments S and move away therefrom in such manner that as the fingers H of one series F are brought to bear upon the segments S the other fingers H of the series F' will be moved away from the coöperating segments S.

In the position of the parts shown in Fig. 1 the resistance R is entirely short-circuited and the resistance R' is entirely included in circuit.

In Fig. 1 suitable devices are shown operatively connecting the core O of magnet M with suitable arms P and P', adapted to coöperate with the spring-fingers H and carry out the operations described. In this instance a suitable lever G is pivoted at H' to a support I and also pivotally connected at J' to a rod K, connected to the core O. A retracting-spring L is shown connected to the lever G to oppose the attractive action of the magnet M. The arms P and P' are suitably connected to the lever G, as by means of the screws Q, and insulation $g$ is provided to insulate the arms P and P' from the lever G. As the core O moves up and down in accordance with the energization of magnet M it will be seen that the spring-fingers H of the series F will be lowered in the contact with the segments S as the spring-fingers H of the series F' are moved away from the segments of the series T, and vice versa. In addition to spring L another spring 28, preferably a coiled spring, is caused to exert a pull on lever G, its office being to compensate for the unbalancing which occurs when motion from normal position takes place.

Referring to Fig. 2, when the lever G is in its neutral position the forces due to the pressures of the opposite sets of contact-fingers are equal and balanced, half the fingers on either side being lifted and half depressed. When the lever moves, however, the number of fingers lifted on one side increases, while the number on the opposite side decreases, thus producing an unbalancing, which increases with motion of the arm. In Fig. 1 is shown one form of device for compensating for this effect. Fig. 6 is a detail of the device. A cam-shaped piece 27 is mounted on a spindle 29. Winding around the cam is a strap, cord, tape, chain, 26, or equivalent connection, having its upper end secured to the lever G. A torsional force is set up by spiral spring 28, which is attached to the spindle 29, tending to rotate it and with it the cam. The tension of spring 28 tends, therefore, to pull down the end of the lever to which the strap is attached, and thus assist the pull of the solenoid M. When the lever is in its normal position, the moment of the pull of the magnet M plus the moment of the pull of spring 28 is equal to the pull of spring L. If the pull of M should increase, movement of the arm P' upward will take place, while P moves downward. The resistance to motion continually increases, due to the beforementioned changing pressure of the fingers. The moment of pull of spring 28, however, continually increases, due to the decreasing radius of cam 27, which diminishes as rotation in the direction shown by the arrow takes place. The converse condition is that of the weaker magnetic pull of M. This allows the spring L to overpower M and 28. In Fig. 3 a cord 26 has one end connected to lever G, the other end being carried around the disk or drum $27^a$, which latter is mounted on spindle $29^a$. Attached to the spindle or drum is the lever-arm 30. Motion of the lever G causes rotation of the drum $27^a$, and therefore of the lever 30. This motion is opposed by the helical spring $28^a$. As may be seen, the position of the spring $28^a$ is such that the effective moment of its pull varies, being a maximum in the position shown by lower dotted lines and a minimum when in the position indicated by the upper dotted lines.

A third method is indicated in Figs. 7 and 8, of which Fig. 7 is an elevation, and Fig. 8 a plan. The lever-arm G has opposite its end a slotted portion in which works a pin $27^b$, which latter is at one end of a lever $30^b$. This end of lever $30^b$ is preferably in the form of a jaw, as shown at $31^b$. Lever $30^b$ is pivoted at $29^b$ and has at its outer end the pin 32. Two helical springs 28' and $28^2$ are attached to the pin 32, as shown, one on either side of lever 30\(^b\). The other ends of the springs are fastened in toward the fulcrum H' of lever G and at a point in the line passing through pin 32 and pivot 27\(^b\) when the lever 30\(^b\) is in its middle or neutral position.

When the levers G and 30\(^b\) are in their neutral positions, the pull of the springs 28' and 28\(^2\) exerts no moving effort on the system. If by reason of change in the pull of magnet M the lever G be caused to begin moving, the lever 30 is displaced, and the pull of the springs 28' and 28\(^2\) assists the motion, whether it be upward or downward. By proper adjustment of parts the assistance to motion produced by springs 28' and 28\(^2\) may be made to substantially compensate for the resistance to motion offered by the contact-fingers.

In the three methods described it will be noted that the motion of lever G is multiplied in some way. This is preferable to attaching the auxiliary or compensating springs directly to lever G, as its motion is designed to be very small. Also it is obvious that similar arrangements in which weights or magnets are substituted for the springs could be made to produce the same results. Also by so shaping the magnet M and proportioning the magnetic relations its pull may be made to increase, because of change of position, when motion is in one direction and decrease when motion is in the opposite direction, and in this way the varying forces of the contact-fingers may be compensated for. In the case of an ordinary solenoid and core the pull increases as the core enters more deeply into the coil, unless the coil be of a specially-wound form or the core specially shaped to preserve constancy of pull for different positions of the core. If in an ordinary solenoid the travel of the core be so fixed, its size and shape so fashioned, and the spring and contact-fingers so proportioned and coördinated as to produce substantial balance of all forces at any point of travel of the lever-arm G, any external compensation will be unnecessary.

Any suitable electric connections may be provided for causing an increase or decrease or reversal of the current in the field D of the auxiliary dynamo C, and, referring to Fig. 1, it will be seen that in this instance the two ends U and W of resistances R and R' are connected by a wire 1, while the other end X of resistance R is connected by wire 2 to one side of battery B, and the other end Y of resistance R' is connected by wire 3 to the other side of the battery B. From the point 4 on wire 1 a wire 5 leads to one side of the field-coil D, which coil is also connected by wire 6 to the point 7 midway of the battery B.

In the operation of the apparatus shown in Fig. 1 when the two resistances R and R' are equal—that is, when each is half cut out or short-circuited—no current flows through the booster-field D and the electromotive force of the booster C is zero. Under these conditions there is no current in the field D, because there is no difference of potential between the middle point 7 of the battery B and the junction-point 4 on the wire 1 between the resistances R and R'. The circuit is complete from one pole of the battery through the resistances R and R' to the other pole of the battery, and the drop through these two resistances in series, each half short-circuited, is equal to the voltage of the battery, and since the resistances are equal the drop through either one of them is equal to half the voltage of the battery. The drop, therefore, from the positive pole of the battery through resistance R' is equal to one-half the battery voltage, and there will be no difference of potential between the points 4 and 7. If one resistance, as R', is completely short-circuited by means of the arm P', it is obvious that the potential of the point 4 will be the same as that of the positive pole of the battery, and therefore the full potential—equal to one-half the battery voltage—is impressed across the booster-field D, tending to cause a current-flow from the junction-point 4 through the field D to the point 7 on the battery. The drop from the junction-point 4 through the entire resistance R to the negative pole of the battery is equal to the full battery voltage. Since the arms P and P' move inversely to each other, when R' is short-circuited R has all its resistance in circuit. Conversely, when R is short-circuited all the resistance of R' is included in the circuit, and then the potential of the junction-point 4 is the same as that of the negative side of the battery and the drop from the point 4 through the resistance R' to the positive side of the battery is equal to the full battery voltage. The current, therefore, will flow through the booster-field D from the point 7 to the negative pole of the battery—that is to say, in a direction opposite to that in which it flowed when R' was short-circuited. It is obvious, therefore, that the booster-field D may be varied in strength from zero to a maximum in either direction and that any desired number of intermediate field strengths may be obtained by varying the resistances R R' inversely to each other.

The arrangement shown in Fig. 1 is merely diagrammatic, and in practice the parts are preferably disposed as shown in Figs. 10 and 11.

In the arrangement shown in Fig. 1 the lever-arms of the pressures set up by the contact-fingers vary greatly and make the problem of balancing or compensating, as before described, a difficult one. It therefore is preferable to so construct the device, as in Fig. 10, that the lever-arm of each of the spring-fingers about the axis H' is the same, and the only varying factor is the number of fingers raised or lowered. In actual construction the contacts and fingers are preferably laid out so that the row of contact-segments is parallel with the axis of the pivot H', and the bars G' and G² are connected at the ends of lever G at right angles to the length of the lever. These bars are parallel to the vertical side of the rows of contacts, but are at an angle with the upper surface of the contacts, as indicated in the figure. When the lever G moves, the fingers on one side will be lifted in consecutive order, while those on the other side will be lowered consecutively. This disposition of the parts maintains the lever-arm constant through the range of motion of G' and G². It, however, sets up a twisting force on the lever G, owing to the variation in the pressures along G' and G². This twisting force may be compensated for by making the bars G' and G² slant in different directions, so that when the outer fingers are lifted on one row the inner fingers are lifted on the other. Throughout the range of motion the sum of the turning moments about the axis of G produced by the pressure of the lifted fingers will be substantially equal to zero.

Another modification is shown in Fig. 11. This is similar to that shown in Fig. 10 except that the bars G' and G² at the ends of the lever G have their upper surfaces beveled from the middle toward either end. With this form of bar the middle finger is the one first lifted when the bar moves upward, and as it proceeds to rise fingers are lifted on both sides of the middle in regular successive order, while the converse will take place when the bar is lowered. Obviously with this arrangement there is no unbalanced turning moment tending to twist G.

In Fig. 3 four resistances R, R', R², and R³ are shown connected to be operated by apparatus at least a portion of which is like that illustrated in Fig. 1. Two additional resistances are included in circuit and the electric connections are suitably changed to carry out the objects of the invention. In Fig. 3 the parts are so constructed and the connections are such that resistances R and R' are included in circuit by means of the series of spring-fingers F and F' when resistances R² and R³ are short-circuited by the series of spring-fingers F² and F³. In this instance the spring-fingers are operated by loose chains, cords, or tapes Z and Z', connected to the cross-arm $h$ of the lever G at the points $i$ and $j$ and fixed at their ends $k$ beyond the resistances and series of spring-fingers. A detail side view, partly in section, of one of the spring-fingers H is shown in Fig. 5, from which it will be seen that each finger is provided with a lug 1, having an aperture $o$ for the reception of the cord or chain Z or Z'. The construction and arrangement of the apparatus are such and the parts are so located relatively to each other that as the portions of the chains or flexible cords connected to operate the spring-fingers F and F' are tightened the cords at the other side of the regulator connected to operate the spring-fingers F² and F³ are slackened or released. According to this operation of the apparatus the spring-fingers on two of the resistances, as R and R', will be raised from the segments S, while the spring-fingers for the other two resistances R² and R³ will be lowered into contact with the contact-segments, thereby short-circuiting the two latter resistances and including the two former resistances R and R' in circuit.

The electric connections in reality constitute a Wheatstone bridge in which the diagonally opposite resistances are varied alike while the adjacent resistances change inversely to each other, the booster-field D of the booster C being connected between the points 12 and 13 on the system in a position corresponding to the usual galvanometer used with the Wheatstone bridge.

As shown, the resistances R and R³ are connected by wire 14 and the resistances R' and R² are connected by wire 15. The junction-points 12 and 13 are upon the wires 15 and 14. Wires 16 and 17 connect the field D with points 12 and 13. From the positive side of the system at the point 18 connection is made by wire 19 to one side of resistance R³ and by wire 20 to one side of resistance R'. From the negative side of the system at the point 21 connection is made by wire 22 to one side of resistance R and by wire 23 to one side of resistance R². As shown, wires 19 and 20 join at the point 24 and wires 22 and 23 join at the point 25.

In the operation of the apparatus and system, with the position of the parts being such that resistances R² and R³ are entirely short-circuited, while resistances R and R' are entirely in circuit, the junction-point 13 will have the potential of the positive side of the system, which will be the potential applied to one terminal of the booster-field D. The junction-point 12 will be at the potential of the negative side of the system, which will also be the potential applied to the other terminal of the booster-field D. Therefore the full potential of the line or battery B is impressed across the booster-field D and in such a direction that current will flow from the point 18 on the positive side of the system by wire 19 to resistance R³, thence around the same by means of the spring-fingers T³ to the junction-point 13, thence by wire 17 to and through the field D of dynamo C, then by wire 16 to the junction-point 12, around the resistance R² by means of spring-fingers F², and thence to the negative side of the system by wires 23 and 22. Conversely, if resistances R and R' are short-circuited and resistances R² and R³ are entirely included in circuit it will be seen that the junction-point 12 will have the same potential as the negative side of the system, while the junction-point 13 will have the same potential as the positive side of the system, and the current will flow from the point 18 on the positive side to the point 21 on the negative side, but in a direction through the field D the reverse of that just described. In this case the current will flow from the point 18 by wires 19 and 20 to and around resistance R', by means of spring-fingers F', to the point 12, thence by wire 16 to and through the field D, back by wire 17 to the point 13 and by wire 14 to resistance R, around which the current will flow by means of the spring-fingers F and out by wire 22 to the point 21 on the negative side of the system. In either instance so far described the full potential of the line or battery B is impressed across the booster-field D. It is obvious, however, that the booster-field may be varied in strength from zero to a maximum in either direction and any desired number of intermediate field strengths may be obtained in accordance with the inverse variations of the two sets of resistances R R' and R² R³.

While the before-described regulators are arranged to short-circuit the resistances by allowing the spring-fingers to come in contact with their respective contacts, an equally efficient and satisfactory device is produced by separating the contact-fingers, connecting each with its tap to the resistance and short-circuiting the fingers by means of the lifting-bar. Fig. 12 shows this method of construction. H H H, &c., are the fingers, each being fastened to the insulating-piece 10ª. At consecutive points along the length of resistance R taps are taken to the consecutive fingers H. The outer ends of the fingers rest on the insulating piece or bar 11ª, which serves merely as a stop to hold all the unlifted fingers parallel. The bar G' at the end of the operating-lever G is a conductor, and as it rises and successively lifts up the fingers that portion of the resistance included between the extreme lifted fingers will be short-circuited, the lifting-bar G' forming the path of the current flowing through the regulator.

In the operation of the regulator any change in the load on the generator A will result in a change in the magnetization of the magnet M, which varies the resistance and produces a corresponding change in the voltage of the auxiliary dynamo C. When the load on the external circuit exceeds the normal, an excitation is given to the field D of dynamo C, which causes the dynamo to generate an electromotive force that adds itself to the electromotive force of the battery, causing the battery to discharge and assist the generator. Conversely, when the external load falls below the normal an electromotive force is produced in the auxiliary dynamo C in an opposite direction, which assists the generator-voltage to send current into the battery.

Fig. 9 shows the use of this device for maintaining constant voltage on a dynamo. In the drawings, D is the dynamo-armature, and $f'$ the field. The main current flows from brush B' over wires 2ᶜ, 4ᶜ, 6ᶜ, and 8ᶜ to the load X X X and from the load back to brush B² over wires 9ᶜ, 5ᶜ, 3ᶜ, and 1ᶜ. R is a resistance having contacts and short-circuiting fingers, as before described. The field-current flows from B' through $f'$ via wires 2ᶜ 16ᶜ, resistance R, and wire 14ᶜ and from $f'$ to B² via wires 11ᶜ, 3ᶜ, and 1ᶜ, 12ᶜ being the junction-point between the field connection 11ᶜ and the main 3ᶜ 5ᶜ.

The magnet M, having core O, is connected across the main circuit, and the voltage impressed on the winding of M is always equal substantially to the electromotive force of the mains. M is attached to lever G, which swings around pivot H'. The pull of M tends to lift G, and thereby raise up more contact-fingers, and so increase the resistance in the field-circuit, while the spring L, which tends to lower the lever G, produces a pull to let down more fingers onto the contacts, thus decreasing the resistance in the field-circuit. When the voltage between the mains is normal, the spring and magnet balance each other. If the voltage should increase, the increased pull of M would overpower the pull of spring L and the lever G would rise, and thereby increase the resistance in the field-circuit, and thus reduce the voltage of the dynamo to normal. Conversely, if the voltage of the dynamo should fall the reduced pull of the magnet M would allow the spring L to overpower the magnetic pull, and the lever G would move down, cutting out some of the resistance in the field-circuit, and thereby raising the voltage to normal. These changes, as mentioned, are more strictly tendencies to change which are checked and compensated for in their inception.

Obviously some features of this invention may be used without others, and the invention may be embodied in widely-varying forms.

Therefore, without limiting the invention to the constructions shown and described nor enumerating equivalents, I claim, and desire to secure by Letters Patent, the following:

1. In a regulator, the combination of circuit-controlling devices, a flexible member for varying the same and electroresponsive means tending to adjust said flexible member in one direction by the current passing through said electroresponsive means, and means exerting a mechanical force opposed to the electroresponsive means and tending to adjust the flexible member in an opposite direction, the two said adjusting means being substantially balanced at all positions throughout the range of adjustment at a given normal current whereby a slight variation from said normal current will cause the adjustment of the regulating device until the normal current is substantially restored.

2. An electric regulator comprising circuit-controlling devices and a flexible member for varying the same, an electroresponsive device controlling said member and having a definite range of travel, motion taking place in said device when the electrical condition of the circuit energizing said device changes, which motion continues until the electrical condition of the energizing-circuit is restored to normal value and means exerting a mechanical force opposing the force of said electroresponsive device.

3. An electric regulator comprising an electroresponsive device connected in circuit in such manner as to be traversed by a substantially constant current, means controlled thereby comprising circuit-controlling devices and a plurality of flexible members for varying the same adapted to be tightened and slackened, motion taking place in the said electroresponsive device when the electrical condition of the circuit energizing the same changes, which motion continues until the electrical condition of the energizing-circuit is restored to normal value.

4. An electric regulating device comprising a resistance and contact-segments, a series of spring-fingers adapted to make contact with said segments, a flexible member coöperating with said spring-fingers and adapted to be tightened and slackened, means tending to adjust said flexible member in one direction by the current passing through the regulating device, and means opposed thereto and tending to adjust the flexible member in an opposite direction, the said two adjusting means being substantially balanced at all positions throughout the range of adjustment at a given normal current, whereby a slight variation from said normal current will cause the adjustment of the regulating device until the normal current is substantially restored.

5. An electric regulating device comprising a plurality of resistances and series of contact-segments, spring-fingers adapted to make contact with said segments, operative means for raising and lowering said fingers to vary the resistances inversely, means tending to adjust said operative means in one direction by the current passing through the regulator and means opposed thereto and tending to adjust said operative means in an opposite direction, the said two adjusting means being substantially balanced at all positions throughout the range of adjustment at a given normal current, whereby a slight variation from said normal current will cause the adjustment of the regulating device until the normal current is substantially restored.

6. An electric regulating device comprising a plurality of resistances and series of contact-segments, spring-fingers adapted to make contact with said segments, devices for raising and lowering said fingers successively and in regular order to vary the resistances inversely, means tending to adjust said devices in one direction by the current passing through the regulator, and means opposed thereto and tending to adjust said devices in an opposite direction, the said two adjusting means being substantially balanced at all positions throughout the range of adjustment at a given normal current, whereby a slight variation from said normal current will cause the adjustment of the regulating device until the normal current is substantially restored.

7. An electric regulating device comprising a resistance, a conducting-piece, and movable contacting pieces coöperating with both the resistance and the conducting-piece, the position of which contacting pieces determines the amount of the resistance in circuit, means tending to adjust said contacting pieces in one direction by the current passing through the regulator, and means opposed thereto and tending to adjust the contacting pieces in an opposite direction, the said two adjusting means being substantially balanced at all positions throughout the range of adjustment at a given normal current, whereby a slight variation from said normal current will cause the adjustment of the regulating device until the normal current is substantially restored.

8. An electric regulating device comprising a resistance, a conducting-piece, and a plurality of movable contacting pieces, which are adapted to electrically connect and disconnect the conducting-piece to points on the resistance, the amount of resistance included in circuit being determined by the number of contacting pieces which are in electrical connection with both the resistance and the conducting-piece, means tending to adjust said contacting pieces in one direction by the current passing through the regulator, and means opposed thereto and tending to adjust the contacting pieces in an opposite direction, the said two adjusting means being substantially balanced at all positions throughout the range of adjustment at a given normal current, whereby a slight variation from said normal current will cause the adjustment of the regulating device until the normal current is substantially restored.

9. An electric regulating device comprising a resistance, a conducting-piece, and a plurality of movable contacting pieces which are adapted to electrically connect and disconnect points on the resistance to the said conducting-piece, thereby varying the said resistance, the amount of resistance included in circuit being determined by the number of contacting pieces which are electrically connected with both the resistance and the conducting-piece and is inversely proportional thereto, means tending to adjust the contacting pieces in one direction by the current passing through the regulator, and means opposed thereto and tending to adjust said contacting pieces in an opposite direction, the said two adjusting means being substantially balanced at all positions throughout the range of adjustment at a given normal current, whereby a slight variation from said normal current will cause the adjustment of the regulating device until the normal current is substantially restored.

10. The combination with a series of contact-segments and resistance connected thereto, of a series of spring-fingers adapted to make contact with said segments, a flexible member adapted to move said fingers to and from the segments, and means for tightening and slackening said member to move the fingers away from and toward the segments.

11. The combination with a plurality of series of contact-segments and resistances connected thereto, of series of spring-fingers adapted to make contact with said segments, flexible members adapted to move said fingers to and from the segments, and means for tightening and slackening said flexible members to move the fingers away from and toward the segments inversely.

12. The combination with a series of contact-segments and resistance connected thereto, of a series of spring-fingers adapted to make contact with said segments, a flexible member coöperating with said segments, and an actuating electroresponsive device and means for tightening and slackening said flexible member.

13. The combination with a plurality of contact-segments and resistances connected thereto, of series of spring-fingers adapted to make contact with said segments, flexible members coöperating with said segments, an actuating electroresponsive device and means for tightening and slackening said flexible members.

In testimony whereof I have signed this specification in the presence of two subscribing witnesses.

JOSEPH BIJUR

Witnesses:
H. L. OBERTEREFFER,
E. VAN ZANDT.